United States Patent [19]
Watanabe et al.

[11] Patent Number: 5,760,578
[45] Date of Patent: Jun. 2, 1998

[54] INDUCTIVE DISPLACEMENT SENSOR SYSTEM DETECTING DISPLACEMENTS IN TWO DIRECTIONS USING A MULTI-BRIDGE CIRCUIT

[75] Inventors: Katsuhide Watanabe, Kanagawa-ken; Naoji Hiraki; Shinichi Moriyama, both of Fukuoka-ken, all of Japan

[73] Assignee: Ebara Corporation, Tokyo, Japan

[21] Appl. No.: 697,007

[22] Filed: Aug. 16, 1996

[30] Foreign Application Priority Data

Aug. 22, 1995 [JP] Japan .................................. 7-237804

[51] Int. Cl.$^6$ ................................................. G01B 7/14
[52] U.S. Cl. ..................... 324/207.19; 324/207.22; 324/207.23
[58] Field of Search ............... 324/207.15–207.26, 324/234; 340/870.32, 870.35, 870.36

[56] References Cited

U.S. PATENT DOCUMENTS

| | | | |
|---|---|---|---|
| 3,010,063 | 11/1961 | Rhoades | 324/207.19 X |
| 3,397,357 | 8/1968 | Metzker et al. | 324/207.19 |
| 3,743,934 | 7/1973 | Risch | 324/207.2 X |
| 4,024,458 | 5/1977 | Templin | 324/207.22 X |
| 4,223,228 | 9/1980 | Kaplan | 324/207.26 X |
| 5,397,212 | 3/1995 | Wanatabe et al. | |

FOREIGN PATENT DOCUMENTS

| | | | |
|---|---|---|---|
| 63-257405 | 10/1988 | Japan . | |
| 1-315204 | 12/1989 | Japan . | |
| 2127550 | 4/1984 | United Kingdom | 324/207.19 |

OTHER PUBLICATIONS

"Theory and Experiment of Magnetic Bearing Combining Radial Control and Thrust Control" The Transaction of the Institute of Electric Engineers, vol. 106, No. 2, Feb. 1986, pp. 55–62.

"Combined Lift and Guide Control for a Normal Conduction Magnetically Suspended Vehicle", Material No. LD–89–56, Linear Drive Studying Group of the Institute of Electric Engineers, 1989, pp. 41–50.

*Primary Examiner*—Gerard R. Strecker
*Attorney, Agent, or Firm*—Oblon, Spivak, McClelland, Maier & Neustadt, P.C.

[57] ABSTRACT

A displacement sensor system is provided which is capable of simultaneously and independently detecting displacements in two directions orthogonal to an axis of an object to be detected, using a less number of displacement sensors than before. The displacement sensor system, for enabling the simultaneous detection of displacements in two directions orthogonal to an axial direction of a pillar-shaped member, has a plurality of displacement sensors positioned around the pillar-shaped member, and a detector circuit for receiving outputs of the plurality of displacement sensors to output signals indicative of displacements in the two directions orthogonal to the axial direction of the pillar-shaped member. The detector circuit includes a multi-bridge circuit for parallelly connecting a circuit having the plurality of displacement sensors connected in series to a plurality of resistor circuits. In one embodiment of the present invention, the pillar-shaped member has a square prism portion, and the plurality of displacement sensors include four displacement sensors, where the displacement sensors are positioned in a plane parallel to a set of opposite surfaces of the square prism portion and in the vicinity of four corners of the square prism portion, respectively. The four displacement sensors are connected in series to form an inductance circuit which constitutes a part of the multi-bridge circuit.

2 Claims, 4 Drawing Sheets

INDUCTIVE DISPLACEMENT SENSOR SYSTEM DETECTING DISPLACEMENTS IN TWO DIRECTIONS USING A MULTI-BRIDGE CIRCUIT

BACKGROUND OF THE INVENTION

1. Field of the Invention

The present invention relates generally to an induction type displacement sensor for detecting displacements of an object to be detected, and more particularly to a displacement sensor system which can simultaneously and independently detect displacements in two orthogonal directions of an object to be detected.

2. Description of the Related Art

FIG. 1 schematically illustrates the configuration of a conventional displacement sensor system. As illustrated, the conventional displacement sensor system employs a set of six sensors L1, L2, L3, L4, L5, L6 having the same inductance value which are arranged such that four (L1, L2, L3, L4) of the sensors are placed above and below the object 1 to be detected and two (L5, L6) of the sensors are placed on the left and right sides of the object 1 to be detected for detecting displacements in two orthogonal directions (vertical and horizontal directions) at both ends of the object 1 to be detected. These sensors are incorporated in a bridge circuit illustrated in FIG. 2 to detect vertical and horizontal displacements of the object 1. The bridge circuit illustrated in FIG. 2 includes an oscillator 2; a differential amplifier 3; an envelope detector 4; and resistors R. Since the operation of the circuit illustrated in FIG. 2 is well known, explanation thereof will be omitted here.

In the conventional displacement sensor system mentioned above for clarifying displacements in two orthogonal directions of the object 1 to be detected, displacement sensors provided in the respective directions must be positioned adjacent to both ends of the object 1 for simultaneously detecting displacement amounts in the two orthogonal directions, i.e., vertical and horizontal directions. The requirement of a number of sensors may cause a problem when a displacement sensor system is limited in lay-out space, cost, weight, and so on.

SUMMARY OF THE INVENTION

The present invention has been made to solve the above-mentioned problem, and its object is to provide a displacement sensor system which is capable of simultaneously and independently detecting displacements in two directions orthogonal to the axis of an object to be detected using a less number of displacement sensors than before.

To achieve this object, the present invention provides a displacement sensor system capable of simultaneously detecting displacements of a pillar-shaped member in two directions orthogonal to an axial direction of the pillar-shaped member, comprising:

a plurality of displacement sensors positioned around the pillar-shaped member; and a detector circuit for receiving outputs of the plurality of displacement sensors to output signals indicative of displacements in the two directions orthogonal to the axial direction of the pillar-shaped member, the detector circuit including a multi-bridge circuit for parallelly connecting a circuit having the plurality of displacement sensors connected in series to a plurality of resistor circuits.

In one embodiment of the present invention, the pillar-shaped member has a square prism portion, and the plurality of displacement sensors includes four sensors, wherein the displacement sensors are positioned in a plane parallel to a set of opposite surfaces of the square prism portion and in the vicinity of four corners of the square prism portion.

The four displacement sensors are connected in series to form an inductance circuit, and the multi-bridge circuit comprises:

a first bridge circuit including a first resistor circuit formed of a first resistor and a second resistor having a resistance value three times the resistance value of the first resistor connected in series and the inductance circuit;

a second bridge circuit including a second resistor circuit formed of third and fourth resistors each having a resistance value twice the resistance value of the first resistor connected in series and the inductor circuit; and a third bridge circuit including a third resistor circuit formed of a fifth resistor having a resistance value three times the resistance value of the first resistor and a sixth resistor having the same resistance value as the first resistor connected in series and the inductance circuit.

The detector circuit comprises:

a differential amplifier unit including a first differential amplifier for receiving an output from the first bridge circuit, a second differential amplifier for receiving an output from the second bridge circuit, and a third differential amplifier for receiving an output from the third bridge circuit;

an envelope detector unit including envelope detectors for detecting envelopes of outputs of the first–third differential amplifiers, respectively; and a processing unit for receiving outputs of the respective envelope detectors to output signals indicative of displacements of the square prism portion in two directions orthogonal to an axis of the square prism portion.

The above and other objects and advantages of the present invention will become more apparent from the following detailed description when read with reference to the accompanying drawings.

DESCRIPTION OF THE PREFERRED EMBODIMENTS

Figure 3:
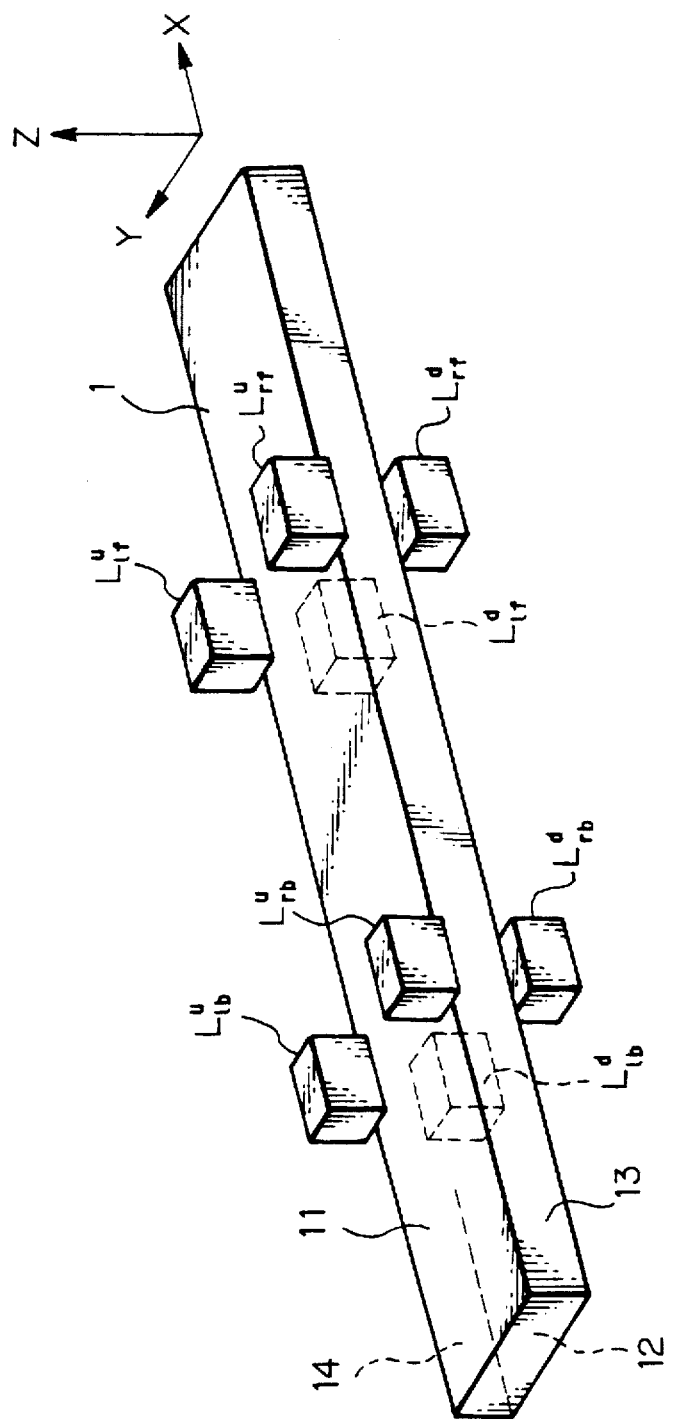
FIG. 3 is a perspective view schematically illustrating the configuration of a displacement sensor system according to the present invention.

FIG. 3 illustrates how induction type sensors constituting a displacement sensor system according to the present invention are positioned with respect to an object to be detected. In FIG. 3, the object, the displacements of which are to be detected, is an elongated pillar-shaped member 1 having a rectangular prism portion with opposite broad surfaces 11, 12 and opposite narrow surfaces 13, 14. Along the longitudinal direction of the pillar-shaped member 1, a set of four displacement sensors $L_{lb}{}^u$, $L_{rb}{}^u$, $L_{rb}{}^d$, $L_{lb}{}^d$ are positioned around the pillar-shaped member 1 on one end thereof, and a second set of four displacement sensors $L_{lf}{}^u$, $L_{rf}{}^u$, $L_{rf}{}^d$, $L_{lf}{}^d$ are positioned around the pillar-shaped member 1 on the other end. While these eight displacement sensors desirably have the same inductance value, they actually have values slightly different from an inductance value $H_0$ when the pillar-shaped member 1 is in a balanced state.

As illustrated in FIG. 3, the longitudinal direction of the pillar-shaped member 1 is defined as X-axis direction, and two axes orthogonal to the X-axis are defined as Y-axis and Z-axis, respectively. Assuming that the surfaces 11, 12 are in parallel with an X-Y plane and the surfaces 13, 14 are in parallel with an X-Z plane, the first set of displacement sensors $L_{lb}{}^u$, $L_{rb}{}^u$, $L_{rb}{}^d$, $L_{lb}{}^d$ and the second set of displacement sensors $L_{lf}{}^u$, $L_{rf}{}^u$, $L_{rf}{}^d$, $L_{lf}{}^d$ are positioned in respective planes parallel to a Y-Z plane. In the first set of displacement sensors, the displacement sensors $L_{lb}{}^u$, $L_{rb}{}^u$ arranged in the Y-axis direction are positioned apart from one broad surface 11 of the pillar-shaped member 1 in the +Z direction, while the displacement sensors $L_{lb}{}^d L_{rb}{}^d$, are positioned apart from the other broad surface 12 of the pillar-shaped member 1 in the −Z direction. Also, the displacement sensors $L_{rb}{}^u$, $L_{rb}{}^d$ arranged in the Z-direction are positioned apart from one narrow surface 13 of the pillar-shaped member 1 in the −Y direction, while the displacement sensors $L_{lb}{}^u$, $L_{lb}{}^d$ are positioned apart from the other narrow surface 14 of the pillar-shaped member 1 in the +Y direction. The second set of displacement sensors are positioned completely in the same manner as the first set of displacement sensors, so that explanation thereof is omitted here.

The first and second sets of induction type displacement sensors are generally referred to as "inductance type" sensors, and are each positioned to form a closed magnetic path including narrow gaps formed between the pillar-shaped member 1 and the respective displacement sensors. With the thus positioned displacement sensors, fluctuations in gap length are detected as changes in inductance of the displacement sensors. In FIG. 3, the first set of displacement sensors and the second set of displacement sensors simultaneously and independently detect displacements of the pillar-shaped member 1 in the Y-direction and the Z-direction.

Figure 4:
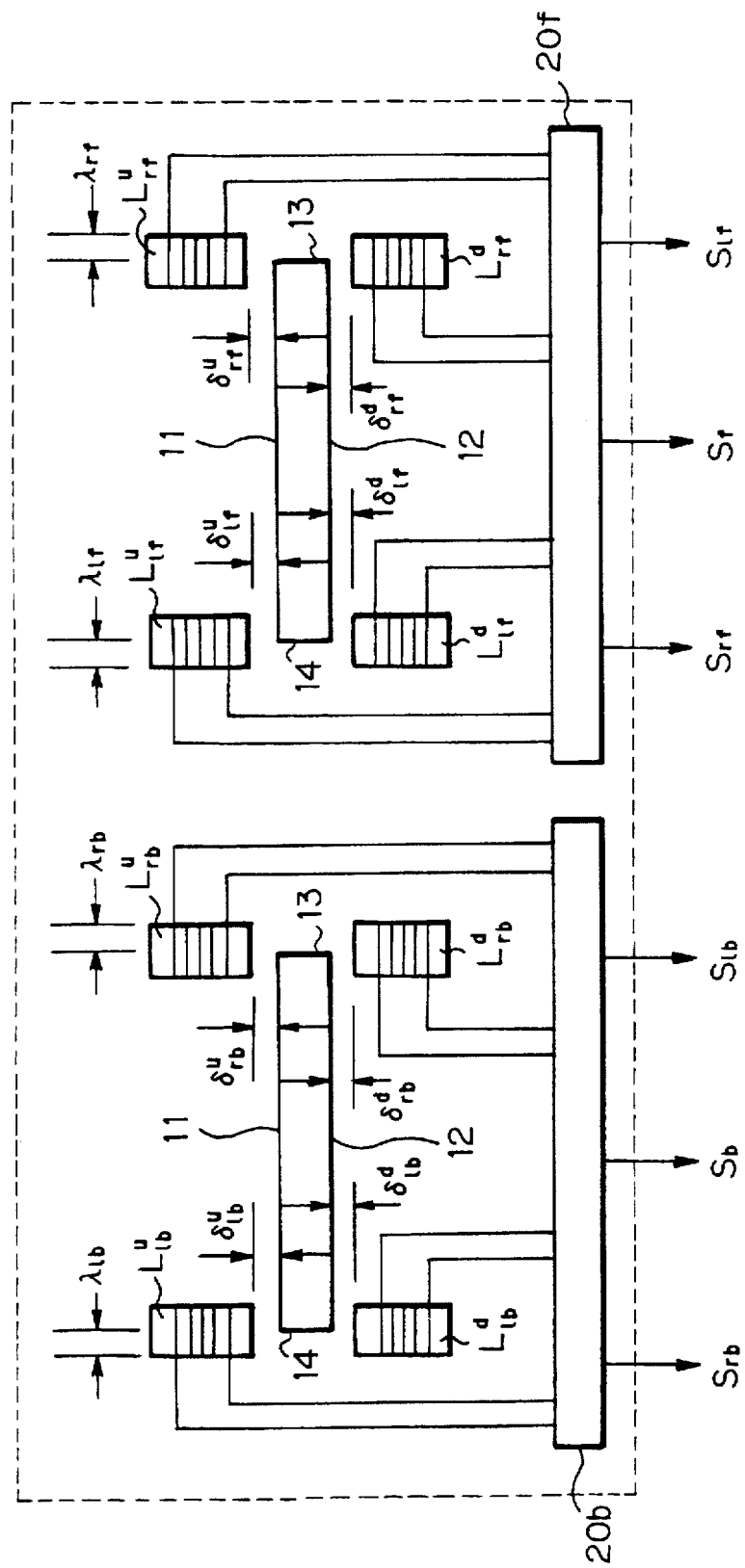
FIG. 4 schematically illustrates a positional relationship between displacement sensors and an object to be detected in the displacement sensor system of the present invention, showing that outputs of the respective displacement sensors are applied to associated detector circuits.

FIG. 4 schematically illustrates how the first and second sets of displacement sensors are positioned with respect to the pillar-shaped member 1 in the Y-Z plane, and also illustrates that output signals of the respective displacement sensors are supplied to detector circuits (later described). As illustrated, detection signals generated by the first set of displacement sensors $L_{lb}{}^u$, $L_{rb}{}^u$, $L_{rb}{}^d$, $L_{lb}{}^d$ are supplied to a first detector circuit 20b, while detection signals generated by the second set of displacement sensors $L_{lf}{}^u$, $L_{rf}{}^u$, $L_{rf}{}^d$, $L_{lf}{}^d$ are supplied to a second detector circuit 20f. The first detector circuit 20b outputs a displacement Sb of the pillar-shaped member 1 made in the Y-direction and supplies displacements Slb, Srb made in the Z-direction at both ends of the pillar-shaped member 1 facing in the Y-direction. Similarly, the second detector circuit 20f outputs a displacement Sf of the pillar-shaped member 1 made in the Y-direction and supplies displacements Slf, Srf made in the Z-direction at both ends of the pillar-shaped member 1 facing in the Y-direction.

In FIG. 4, assuming that a gap length between the displacement sensor $L_{lb}{}^u$ and the surface 11 is represented by $\delta_{lb}{}^u$; a gap length between the displacement sensor $L_{rb}{}^u$ and the surface 11 by $\delta_{rb}{}^u$; a gap length between the displacement sensor $L_{rb}{}^d$ and the surface 12 by $\delta_{rb}{}^d$; and a gap length between the displacement sensor $L_{lb}{}^d$ and the surface 12 by $\delta_{lb}{}^d$, and likewise for the second set of displacement sensors, a gap length between the displacement sensor $L_{lf}{}^u$ and the surface 11 is represented by $\delta_{lf}{}^u$; a gap length between the displacement sensor $L_{rf}{}^u$ and the surface 11 by $\delta_{rf}{}^u$, a gap length between the displacement sensor $L_{rf}{}^d$ and the surface 12 by $\delta_{rf}{}^d$; and a gap length between the displacement sensor $L_{lf}{}^d$ and the surface 12 by $\delta_{lf}{}^d$, a difference $\delta ij$ in gap length in the Z-direction at both ends of the pillar-shaped member 1 is expressed by:

$$\delta ij = \tfrac{1}{2}(\delta_{ij}{}^u - \delta_{ij}{}^d) = \delta_{ij}{}^u - \delta o = \delta o - \delta_{ij}{}^d \tag{1}$$

where i represents l or r, j represents b or f, and $\delta o$ is a displacement amount in a balanced state (reference value).

Similarly, assuming that a deviation in the Y-direction between the displacement sensor $L_{lb}{}^u$ (or $L_{lb}{}^d$) and the pillar-shaped member 1 is represented by $\lambda lb$; a deviation in the Y-direction between the displacement sensor $L_{rb}{}^u$ (or $L_{rb}{}^d$) and the pillar-shaped member 1 by $\lambda rb$; a deviation in the Y-direction between the displacement sensor $L_{lf}{}^u$ (or $L_{lf}{}^d$) and the pillar-shaped member 1 by $\lambda lf$; and a deviation in the Y-direction between the displacement sensor $L_{rf}{}^u$ (or $L_{rf}{}^d$) and the pillar-shaped member 1 by $\lambda rf$, a difference in deviation $\lambda j$ in the Y-direction of the pillar-shaped member 1 (referred to as a "difference in stagger length") is expressed by:

$$\lambda j = \tfrac{1}{2}(\lambda lj - \lambda rj) = \lambda lj - \lambda o = \lambda o - \lambda rj \tag{2}$$

where $\lambda o$ is a deviation in a balanced state (reference value), and j represents b or f.

Figure 1:
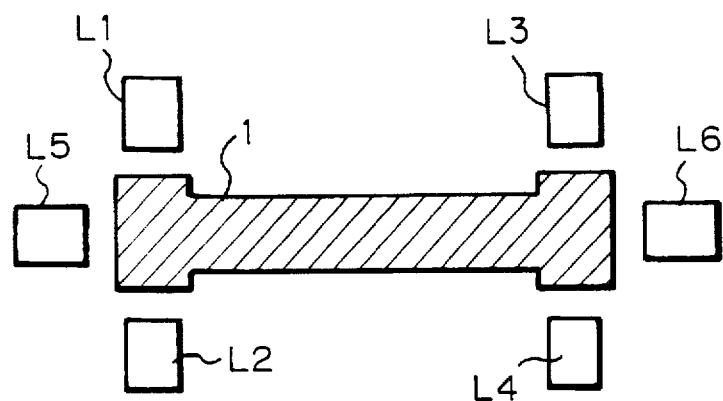
FIG. 1 schematically illustrates the configuration of a conventional displacement sensor system.
Figure 2:
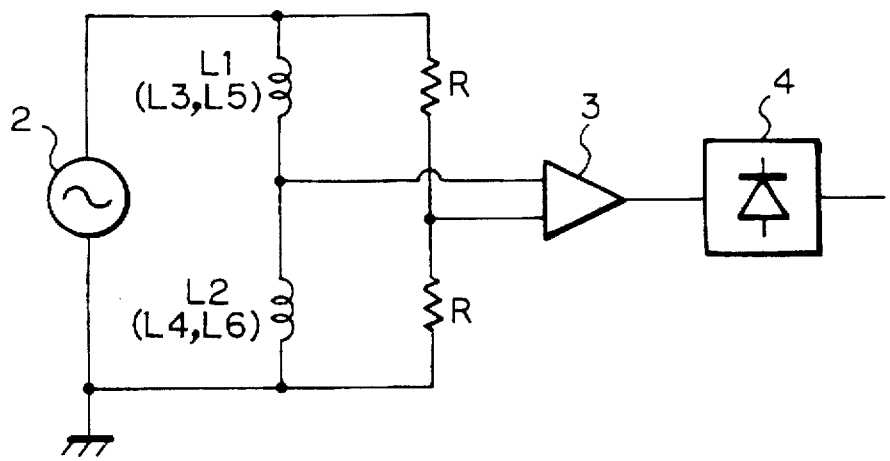
FIG. 2 illustrates the configuration of a bridge circuit in the displacement sensor system of FIG. 1.

When a pair of induction type displacement sensors arranged for detecting a displacement in the Z-direction (for example, $L_{lb}{}^u$ and $L_{lb}{}^d$) are incorporated in the bridge circuit of FIG. 2, the difference $\delta ij$ in gap length, given by the foregoing equation (1), can be measured, whereas the difference $\lambda j$ in stagger length, given by the equation (2) cannot be measured since changes in inductance of the displacement sensors are canceled.

Figure 5:
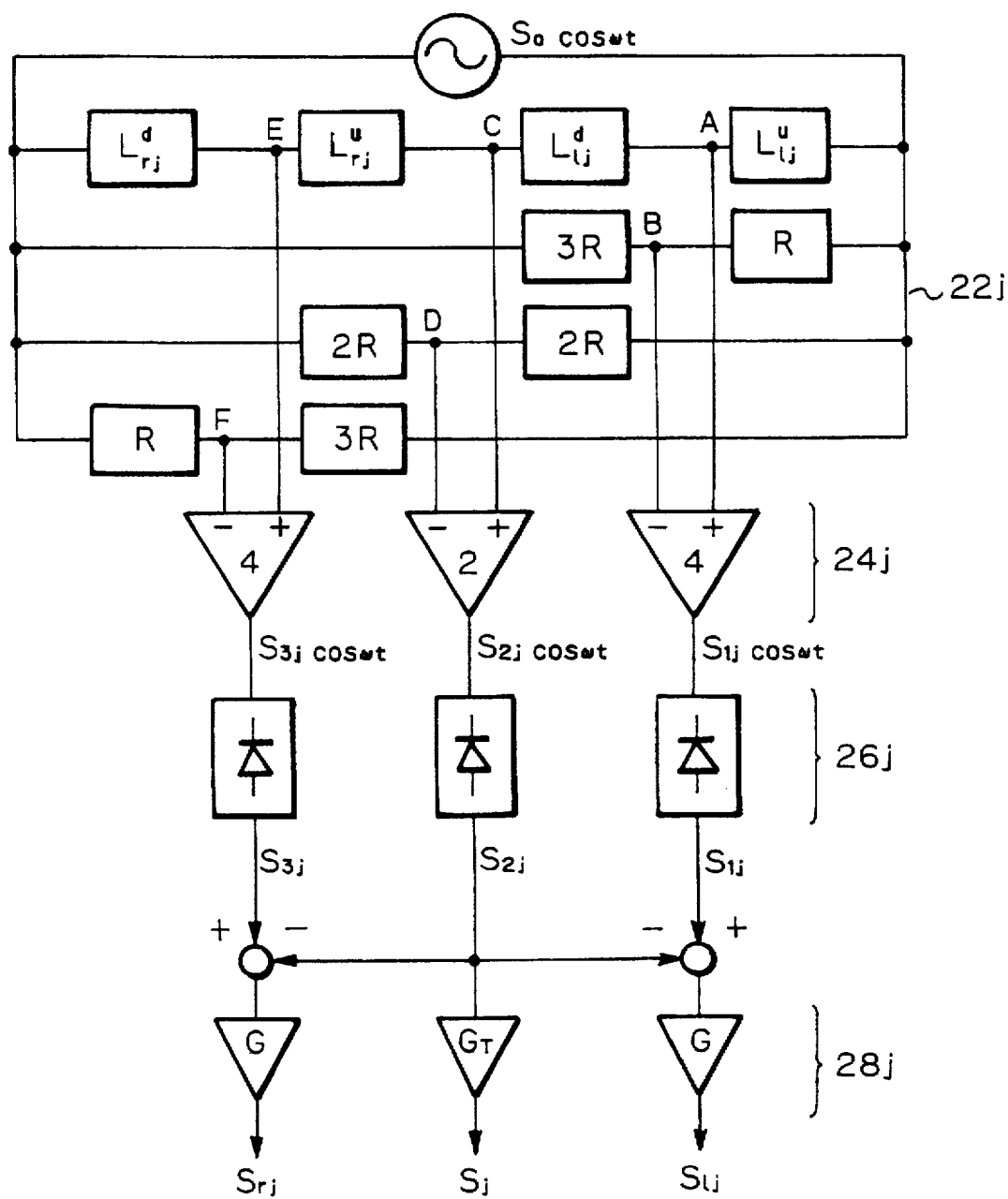
FIG. 5 illustrates in detail the configuration of the detector circuit in FIG. 4.

To eliminate this inconvenience, the present invention employs a multi-bridge circuit for the first detector circuit 20b and the second detector circuit 20f. FIG. 5 schematically illustrates the configuration of the first detector circuit 20b (or the second detector circuit 20f), where j represents b or f. Specifically, in FIG. 5, a detector circuit 20j comprises a multi-bridge circuit 22j, differential amplifiers 24j, envelope detectors 26j, and operational amplifiers 28j. As illustrated in FIG. 5, the multi-bridge circuit 22j is composed of: (1) a first bridge for connecting a first resistor circuit having a resistor R and a resistor 3R connected in series to an inductance circuit having a first or second set of displacement sensors $L_{rj}{}^d$, $L_{rj}{}^u$, $L_{lj}{}^d$, $L_{lj}{}^u$ connected in series to extract an output from connecting points A, B; (2) a second bridge for connecting a second resistor circuit having a resistor 2R and a resistor 2R connected in series to the inductance circuit for extracting an output from connecting points C, D; and (3) a third bridge for connecting a third resistor circuit having a resistor 3R and a resistor R connected in series to the inductance circuit for extracting an output from connecting points E, F. Specific values of R depend on the inductance of the sensor coils used and accordingly must be adjusted on this basis. The frequency of the output signal also varies according to the size, shape and material of the inductive sensor and thus is not fixed. Optimum values for these two variables are easily selected in each case.

In the following, description will be made how the detector circuit 20j can detect displacement of the pillar-shaped member 1 in the Y-direction and the Z-direction.

Assuming herein that respective inductance values of the displacement sensors $L_{ij}^u$, $L_{ij}^d$, $L_{rj}^u$, $L_{rj}^d$ are represented by $H_{ij}^u$, $H_{ij}^d$, $H_{rj}^u$, $H_{rj}^d$ for convenience, when each inductance value is expanded up to the first order in the vicinity of the reference value δo of the gap length and the reference value λo of the stagger length, the following equation (5) is derived:

$$H_{ij}^u \approx Ho - \alpha(\delta_{ij}^u - \delta o) + \alpha_T(\lambda j - \lambda o) \quad (5)$$

$$H_{ij}^d \approx Ho - \alpha(\delta_{ij}^u - \delta o) + \alpha_T(\lambda j - \lambda o)$$

$$\alpha = \frac{\partial H_{ij}^u}{\partial \delta_{ij}^u}\bigg|_0 = \frac{\partial H_{ij}^d}{\partial \delta_{ij}^d}\bigg|_0$$

$$\alpha_T = \frac{\partial H_{ij}^u}{\partial \lambda j}\bigg|_0 = \frac{\partial H_{ij}^d}{\partial \lambda j}\bigg|_0$$

In FIG. 5, when the displacement sensors $L_{rj}^\delta$, $L_{rj}^u$, $L_{ij}^d$, $L_{ij}^u$ are connected in series, and an alternating current output signal $S_0\cos\omega t$ is applied between both terminals of the circuit, the differential amplifiers 24j, which receive respective outputs of the first—third bridges, generate $S_{1j}\cos\omega t$, $S_{2j}\cos\omega t$, $S_{3j}\cos\omega t$, respectively. It should be noted that numbers written in symbols of the differential amplifiers 24j, i.e., 4, 2, 4, are multiples for matching the magnitudes of the output signals from the respective differential amplifiers for displacements (see equations (6), (7), (8), later described).

The outputs of the differential amplifiers 24j are detected by envelope detectors 26j to generate signals $S_{1j}$, $S_{2j}$, $S_{3j}$. The detection signals $S_{1j-S3j}$ may be expressed as follows using δij in the equation (1) and λj in the equation (2):

$$S_{1j} = 4So\left(\frac{H_{1j}^d + H_{rj}^u + H_{rj}^d}{H_{1j}^u + H_{1j}^d + H_{rj}^u + H_{rj}^d} - \frac{3}{4}\right) \quad (6)$$

$$= -\frac{So}{Ho}(\alpha\delta ij + \alpha_T \lambda j)$$

$$S_{2j} = 2So\left(\frac{H_{rj}^u + H_{rj}^d}{H_{1j}^u + H_{1j}^d + H_{rj}^u + H_{rj}^d} - \frac{2}{4}\right) \quad (7)$$

$$= -\frac{So}{Ho}\alpha_T \lambda j$$

$$S_{3j} = 4So\left(\frac{H_{rj}^d}{H_{1j}^u + H_{1j}^d + H_{rj}^u + H_{rj}^d} - \frac{1}{4}\right) \quad (8)$$

$$= -\frac{So}{Ho}(\alpha\delta r + \alpha_T \lambda j)$$

As is apparent from the equations (6), (8), the signals $S_{1j}$ and $S_{3j}$ include the signal $S_{2j}$. Thus, when $S_{1j}$ and $S_{3j}$ are applied to the associated operational amplifiers 28j after $S_{2j}$ is subtracted therefrom while $S_{2j}$ is applied as it is to the associated operational amplifier 28j, the operational amplifiers 28j generate the following signals as their outputs:

$$Sij = -\frac{GSo\alpha}{Ho}\delta ij, \quad (9)$$

$$Sj = -\frac{G_T So\alpha_T}{Ho}\lambda j$$

The equation (9) shows that displacements of the pillar-shaped member 1 in the Y-direction and the Z-direction can be simultaneously and independently detected by positioning four displacement sensors around the pillar-shaped member 1 as illustrated in FIG. 3 and by using the detector circuit 20j having the configuration illustrated in FIG. 5.

What is claimed is:

1. A displacement sensor system capable of simultaneously detecting displacements of a pillar-shaped member in two directions orthogonal to an axial direction of said pillar-shaped member, comprising:

a plurality of displacement sensors positioned around said pillar-shaped member, said pillar-shaped member having a rectangular prism portion, and said plurality of displacement sensors including four sensors, said displacement sensors positioned in a plane parallel to a set of opposite surfaces of said rectangular prism portion and in the vicinity of four corners of said rectangular prism portion;

said four displacement sensors being connected in series to form an inductance circuit; and a detector circuit for receiving outputs of said plurality of displacement sensors and producing output signals indicative of displacements in the two directions orthogonal to the axial direction of said pillar-shaped member, said detector circuit including a multi-bridge circuit, said multi-bridge circuit including:

a first bridge circuit including a first resistor circuit formed of a first resistor and a second resistor having a resistance value three times the resistance value of said first resistor connected in series and said inductance circuit and having an output;

a second bridge circuit including a second resistor circuit formed of third and fourth resistors each having a resistance value twice the resistance value of said first resistor connected in series and said inductance circuit and having an output; and a third bridge circuit including a third resistor circuit formed of a fifth resistor having a resistance value three times the resistance value of said first resistor and a sixth resistor having the same resistance value as the first resistor connected in series and said inductance circuit and having an output.

2. A displacement sensor system according to claim 1, wherein:

said detector circuit comprises:

a differential amplifier unit including a first differential amplifier for receiving an output from said first bridge circuit, a second differential amplifier for receiving an output from said second bridge circuit, and a third differential amplifier for receiving an output from said third bridge circuit;

an envelope detector unit including envelope detectors for detecting envelopes of outputs of said first–third differential amplifiers, respectively; and a processing unit for receiving outputs of said respective envelope detectors to output signals indicative of displacements of said rectangular prism portion in two directions orthogonal to an axis of said rectangular prism portion.

* * * * *

UNITED STATES PATENT AND TRADEMARK OFFICE
CERTIFICATE OF CORRECTION

PATENT NO.   : 5,760,578
DATED        : June 2, 1998
INVENTOR(S)  : Katsuhide WATANABE, et al.

It is certified that error appears in the above-indentified patent and that said Letters Patent is hereby corrected as shown below:

On the title page, Item [54], the title is incorrect. It should read:

-- INDUCTIVE DISPLACEMENT SENSOR FOR DETECTING DISPLACEMENTS IN TWO DIRECTIONS USING A MULTI-BRIDGE CIRCUIT --

Signed and Sealed this

Twentieth Day of October, 1998

Attest:

BRUCE LEHMAN

*Attesting Officer*    *Commissioner of Patents and Trademarks*